Oct. 30, 1928.

W. H. WORTHINGTON 1,689,314

THRASHING MACHINE

Filed Jan. 25, 1926 2 Sheets-Sheet 1

Inventor.
Wayne H. Worthington
by Parker + Carter
Attorneys.

Oct. 30, 1928.
W. H. WORTHINGTON
THRASHING MACHINE
Filed Jan. 25, 1926
1,689,314
2 Sheets-Sheet 2
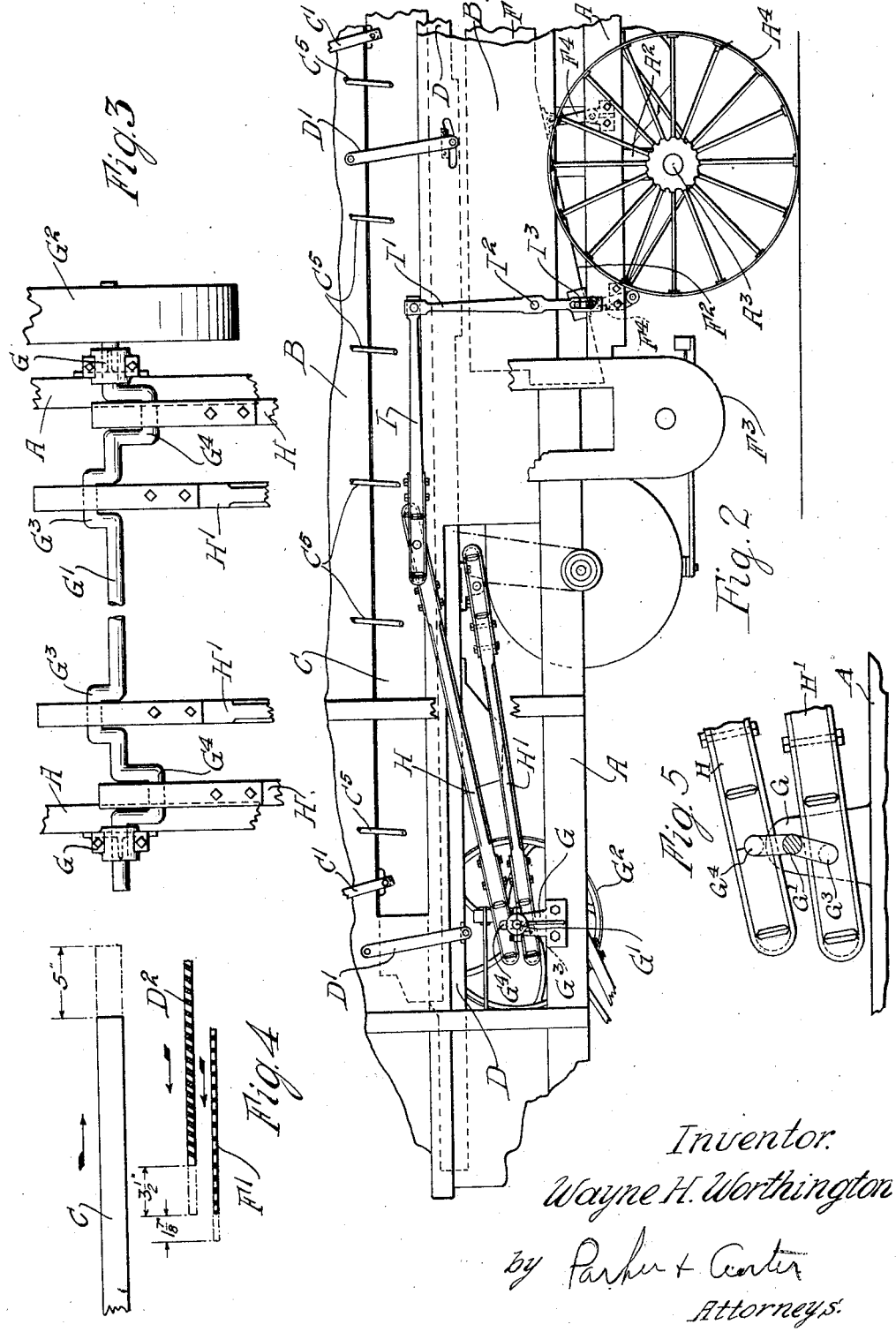
Inventor.
Wayne H. Worthington
by Parker & Carter
Attorneys.

Patented Oct. 30, 1928.

1,689,314

UNITED STATES PATENT OFFICE.

WAYNE H. WORTHINGTON, OF BATTLE CREEK, MICHIGAN, ASSIGNOR TO ADVANCE-RUMELY COMPANY, OF LA PORTE, INDIANA, A CORPORATION OF INDIANA.

THRASHING MACHINE.

Application filed January 25, 1926. Serial No. 83,478.

My invention relates to improvements in thrashing machines or grain separators and has for one object to arrange the relation between the shoe, the grain pan and the straw rack so as to give the machine inherent balance and so as to so relate the weights, direction of motion and throw of the various reciprocating parts as to enable them to satisfactorily balance one against the other.

The amount of throw or control to be given to the straw rack, the grain pan and the shoe has been worked empirically and the relation between these various traveling parts is generally known. For instance, on the machine which I am making the straw rack has a travel of five inches or a throw of two and one-half. The grain pan has a travel of three and one-half inches and a throw of one and three-fourths and the shoe a travel of one and seven-eighths or a throw of fifteen-sixteenths. The straw rack is normally heavier than either the shoe or the grain pan and its inertia owing to its longer travel is greater than the inertia of the grain pan and the shoe together though of course these particular weights and inertia relations might be changed.

It has been customary in the past to so arrange the relation between the sieve carried by the grain pan and the sieve carried by the shoe that either they reciprocate in opposition or they reciprocate in the same direction at the same rate of speed and with the same travel. This is undesirable because better thrashing is obtained when the travel of the shoe and the grain pan is different.

When the grain pan and the shoe are given the desired different travel and are caused to reciprocate in opposite direction another difficulty arises in that occasional pieces of straw work their way through the two sieves and as the sieves reciprocate in opposite directions this straw is bent and twisted and balled up and jammed in the two sieves owing to the different phases of their motion.

I propose to reciprocate the two sieves in the same direction with different travel and I do this by driving the shoe by means of the lever associated with the straw rack. The straw rack operates in opposite phase from the grain pan and when the lever is pivoted between the shoe and the straw rack; this will result in driving the shoe in the same phase or in the same direction as the grain pan but in giving it a different length of travel owing to the difference in the two lengths of the lever arms. Thus the grain pan will travel in the same direction as the shoe and the inertia force of the grain pan and the shoe will be in opposite phase from the inertia force of the straw rack, thus assisting in balancing as well as making it possible to use smaller screens and decrease the weight of the reciprocating parts and the expense of manufacture. Other objects will appear from time to time throughout the specification and claims.

My invention is illustrated more or less diagrammatically in the accompanying drawings, wherein:

Figure 2 is a side elevation of a part of the thrasher;

Figure 3 is a plan view of the driving crank shaft;

Figure 4 shows diagrammatically the relative degrees of movement of the three main moving parts;

Figure 5 is a detail elevation on an enlarged scale showing the crank shaft.

Like parts are indicated by like characters throughout.

Figure 1:
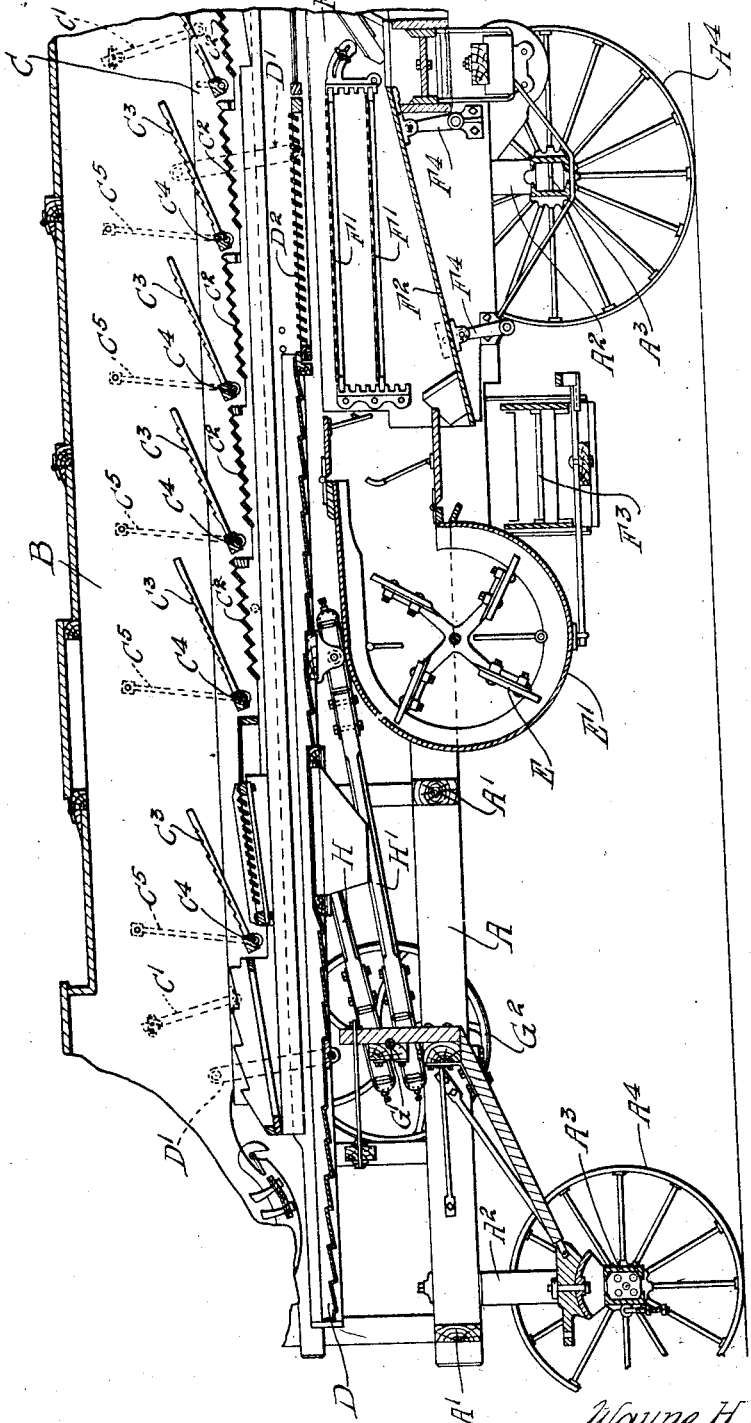
Figure 1 is a longitudinal vertical section of the thrasher to which my invention is applied.

A A are sills or side members of a frame joined by cross members $A^1$ $A^1$. Upon this frame the parts of the thrasher are assembled. By means of the members $A^2$ $A^2$ the frame itself is supported upon axles $A^3$ $A^3$ and wheels $A^4$ $A^4$.

The thrasher is provided with a casing or housing designated generally by the letter B. Within this housing the actual thrashing parts are positioned.

C is a straw rack. It is supported from the housing B by means of links $C^1$ $C^1$. It is provided with screening or sieve surfaces $C^2$ $C^2$ and lifting fingers $C^3$ $C^3$ which are mounted on rock shafts $C^4$ which are pivoted in the frame C and provided at their outer ends with lever arms $C^5$ fastened to the casing B. Thus movement of the straw rack causes the lifting fingers to rise and fall.

D is a grain pan supported from the housing B by means of links $D^1$ $D^1$. At one end it is provided with a sieve portion $D^2$.

E is a usual cleaning fan mounted in the housing $E^1$. F is a grain cleaning shoe. It is provided with a pair of screening surfaces $F^1$ $F^1$ and an inclined bottom $F^2$ which discharges into the conveyor $F^3$. It is supported upon link arms $F^4$ which are pivotally supported from the frame members A.

G G are bearings supported from the side frame members A, carrying the crank shaft $G^1$ which has at one end a driving pulley $G^2$ by means of which they may be driven from any suitable power source, such as a belt. It is provided with pairs of laterally bent portions or throws $G^3$ $G^3$ and $G^4$ $G^4$, $G^3$ being shorter than $G^4$.

Upon each of the crank throws $G^4$ is mounted a pitman H, which is pivotally attached to the straw rack C. Upon each of the crank throws $G^3$ is mounted a pitman $H^1$. These pitmen $H^1$ are each pivotally joined to the grain pan D.

I is a link pivotally attached at one end to the straw rack C and at the other end pivoted to a lever arm $I^1$ which is itself pivotally mounted on a part of the housing B, at $I^2$. Its lower end below its pivot point is attached to the grain cleaning shoe at $I^3$.

It will be noted that the cleaning shoe and the grain pan travel together in the same direction, the grain pan preferably having a slightly greater excursion than the shoe. It will be noted also that the straw rack travels farther than either the grain pan or the shoe and normally travels in a direction opposite to them, and thus these parts in their movement balance each other. This feature is brought about and made possible by the arrangement of the throws of the crank shaft which are of different length and which are situated so that they are not opposite each other, that is they are not 180° apart. Since the grain pan and shoe move together, and since the sieve portion $D^2$ of the grain pan is shorter than the sieve portion $F^1$ of the shoe, the sieve portion $D^2$ is always over some part of the surface $F^1$. Thus grain passing through $D^2$ will fall upon $F^1$ and will thus be directed to the shoe and through it to the conveyor, and there is no possibility of grain being carried too far so as to fall beyond the shoe or otherwise to fall or be thrown out of its proper line of travel and to come into some part of the machine not designed to receive it.

Although I have shown an operative device, still it will be obvious that many changes might be made in size, shape and arrangement of parts without departing materially from the spirit of my invention; and I wish, therefore, that my showing be taken as in a sense diagrammatic.

As shown in Figure 4 the parts which are drawn to scale have indicated in connection with each of them the length of its travel.

The use and operation of my invention are as follows:

When separating or thrashing is to be done the parts are set in operation by rotation of the shaft $G^1$. The rotation of this crank shaft acting through the pitmen H $H^1$ causes the straw rack and the grain pan to move backwards and forwards in balanced relation to each other, one moving to the right and the other moving to the left, and each reversing its movement at the same time. The cleaning shoe moves with the grain pan. Its length of excursion being shorter. Thus there is provided a balanced movement of these parts which greatly reduces the vibration on the machine as a whole, and consequently reduces its wear and prolongs its life. The arrangement of the cleaning shoe with relation to the sieve portions of the grain pan prevents spilling and loss of grain.

I claim:

1. In combination in a machine a plurality of reciprocating parts the length of travel of which differs one from another and means for driving them in balanced relation, whereby they all reverse their direction of movement at the same time.

2. In combination in a thrasher, a plurality of grain treating reciprocating members, the length of travel of which differs one from another, and means for driving them in balanced relation, whereby they all reverse their direction of movement at the same time.

3. In combination in a thrasher, a plurality of grain treating reciprocating members the length of travel of which differs one from another, and means for driving them in balanced relation from a common source, whereby they all reverse their direction of movement at the same time.

4. In combination in a machine three reciprocating parts, and means for driving them in balanced relation along substantially parallel paths whereby two of the three parts are moved in unison in one direction, and the third is moved in the opposite direction, and whereby the two reverse their direction of movement at the same time that the third reverses its direction of movement.

5. In combination in a machine, three reciprocating parts each separately supported, and means for driving them in balanced relation along substantially parallel paths whereby two of the three parts are moved in unison in one direction, and the third is moved in the opposite direction, and whereby the two reverse their direction of movement at the same time that the third reverses its direction of movement.

6. In combination in a machine three reciprocating parts each separately supported, and means for driving them in balanced relation along substantially parallel paths from a common source whereby two of the three parts are moved in unison in one direction, and the third is moved in the opposite direction, and whereby the two reverse their direction of movement at the same time that the third reverses its direction of movement.

7. In combination in a thrasher, a straw rack, grain pan and grain shoe, and means for reciprocating them in balanced relation whereby they all reverse their direction of movement at the same time.

8. In combination in a thrasher, a straw rack, grain pan and grain shoe, and means for moving them in balanced movement whereby the grain pan and shoe are balanced against the straw rack and whereby the grain pan and shoe reverse their direction of movement at the same time that the straw rack reverses its movement.

9. In combination in a thrasher, a straw rack, grain pan and grain shoe, each separately supported for reciprocated movement, and means for moving them in balanced movement whereby the grain pan and shoe are balanced against the straw rack and whereby the grain pan and shoe reverse their direction of movement at the same time that the straw rack reverses its movement.

10. In combination in a thrasher, a straw rack, grain pan and grain shoe, each separately supported for reciprocated movement upon the thrasher frame, and means for moving them in balanced movement whereby the grain pan and shoe are balanced against the straw rack and whereby the grain pan and shoe reverse their direction of movement at the same time that the straw rack reverses its movement.

11. In a thrasher, a straw rack, a grain pan and grain shoe, means for reciprocating all of them in balanced relation and means for driving them whereby two of them travel in the same direction and the third travels in the reverse direction, the reversal of direction of the parts taking place simultaneously.

12. In combination with a thrasher, a straw rack, grain pan and grain shoe, means for reciprocating all of them in balanced relation, the grain shoe being mounted so as to move in the same direction as the grain pan, and means for reversing the direction of movement of the parts so that the grain pan and grain shoe reverse their direction of movement at the same time as the straw rack.

13. In combination with a thrasher, a straw rack, grain pan and grain shoe, means for reciprocating all of them in balanced relation, the grain shoe being mounted so as to move in the same direction as the grain pan, and means for reversing the direction of movement of the parts so that the grain pan and grain shoe reverse their direction of movement at the same time as the straw rack, the grain pan having a sieve portion which is thus held constantly in opposition to the sieve portion of the grain shoe.

14. In a thrasher, a removably mounted grain pan, a sieve part formed within said pan and adapted to move with it in combination with a grain shoe movably mounted beneath said grain pan, and a sieve portion within said grain shoe carried thereby and adapted to move therewith, the sieve portion of the grain shoe being beneath the sieve portion of the grain pan, driving means for driving said grain shoe and said grain pan, said driving means so arranged so as to reciprocate the two together in the same direction whereby the sieve portion of the grain pan is constantly in all positions of movement above the sieve portion of the grain shoe.

15. In a thrasher, a movably mounted grain pan, a sieve portion mounted in and adapted to move with said grain pan, a grain shoe movably mounted beneath said grain pan, a sieve portion mounted within said grain shoe adapted to move therewith, the sieve portion of the grain shoe being beneath the sieve portion of the grain pan, the grain pan and the grain shoe mounted for movement, there being driving means adapted to reciprocate the two together at varying rates of speed whereby the sieve portion of the grain pan is at all times and in all positions of movement above the sieve portion of the grain shoe.

Signed at Battle Creek county of Calhoun and State of Michigan, this 18th day of January 1926.

WAYNE H. WORTHINGTON.